April 12, 1966 L. G. STEPHENSON 3,245,181
ANCHOR PLATE FOR POSTS
Filed Aug. 7, 1961 3 Sheets-Sheet 1

INVENTOR
Lloyd G. Stephenson
BY Robert C. Sullivan
ATTORNEY

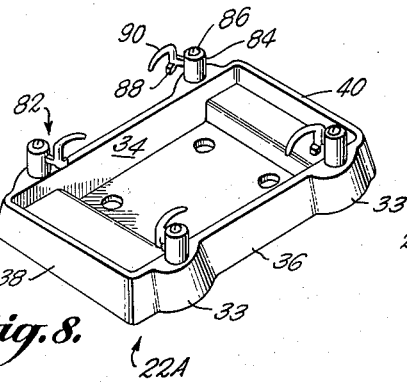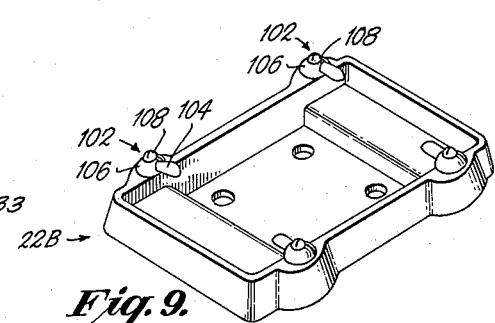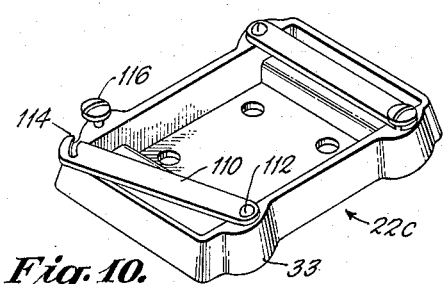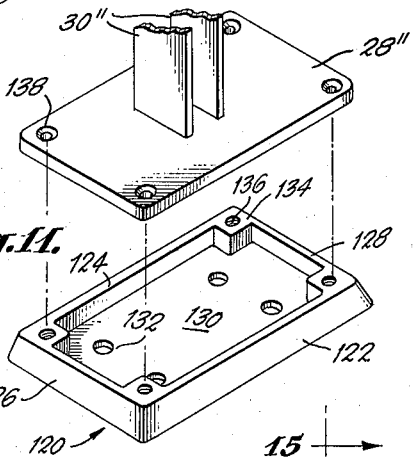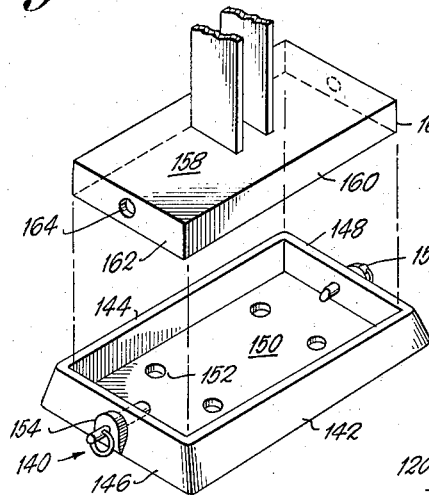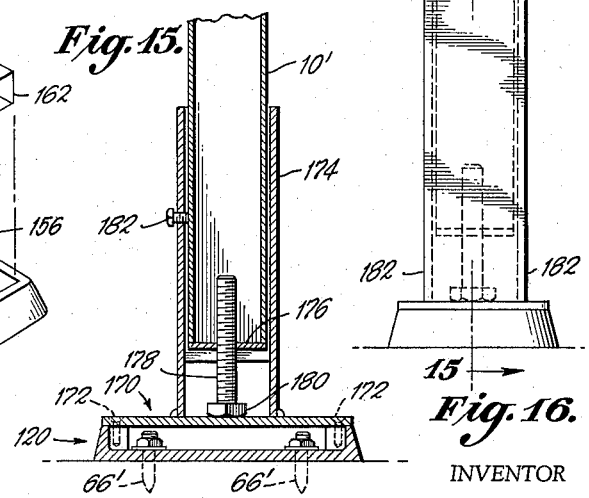
INVENTOR
Lloyd G. Stephenson
BY Robert C. Sullivan
ATTORNEY April 12, 1966　　　L. G. STEPHENSON　　　3,245,181
ANCHOR PLATE FOR POSTS
Filed Aug. 7, 1961　　　　　　　　　　　　　3 Sheets-Sheet 3
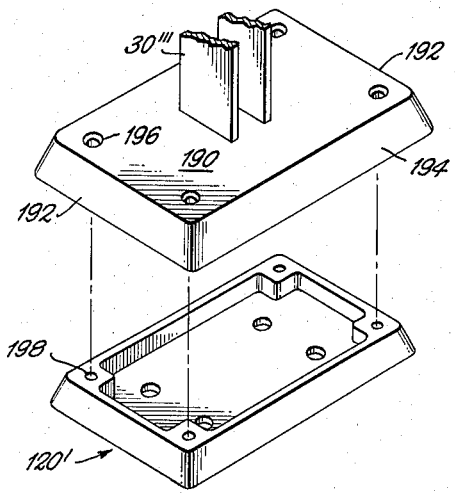
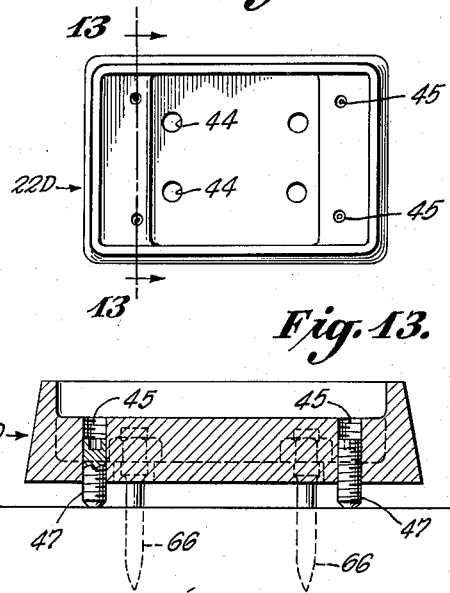
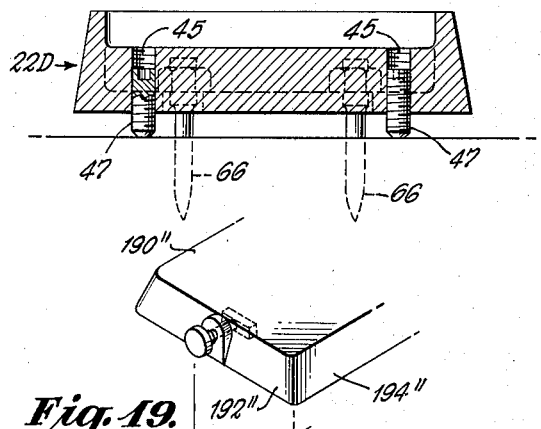
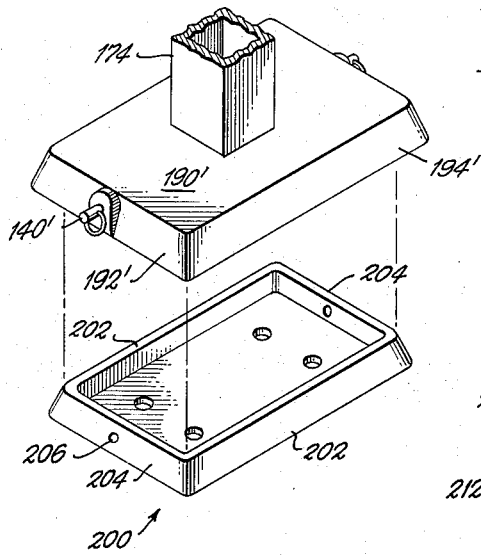
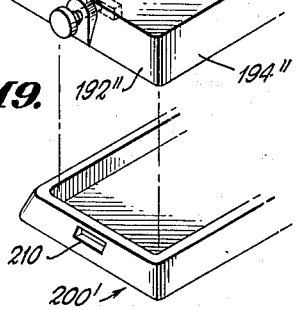
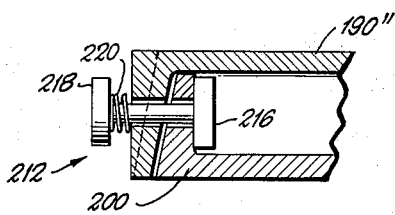
INVENTOR
*Lloyd G. Stephenson*
BY *Robert C. Sullivan*
ATTORNEY

3,245,181
ANCHOR PLATE FOR POSTS
Lloyd G. Stephenson, Bethel Road, Hartselle, Ala.
Filed Aug. 7, 1961, Ser. No. 129,868
6 Claims. (Cl. 52—122)

This invention relates to supports or anchors for posts and more particularly to an anchor or mounting plate for posts. The invention has particular utility for anchoring the posts of office partitions and will be described in connection with such use. However, the anchor device of the invention is not restricted to such use and may be used for anchoring any free standing post.

In many business establishments and government offices, there is a widespread use of partition structures which suitably subdivide the office space for greater working efficiency and for economical utilization of space.

It is frequently the practice to anchor the posts of the partition to the building floor, the posts usually being provided at their lower extremity with a flat plate member which is anchored to the floor. In anchoring partition posts to concrete floors, the prior art practice and method has usually involved the drilling of four holes in the concrete floor and the placing of a lead anchor in each of the four holes, the anchor being tamped and expanded into frictional engagement with the drilled hole. The base plate attached to the bottom of the partition post is then positioned over the anchor members, and holes in the base plate of the partition post are lined up with the screw holes in the anchor members. Screws are passed through holes in the base plate of the post and into threaded engagement with the anchor members to secure the partition post in position.

The prior art method of mounting partition posts just described is very time consuming from a labor standpoint and consequently very expensive. Also, the installation of the lead anchors in the concrete floor requires prolonged periods of noise with electric hammers or other tools, which is very distracting to office personnel who may be attempting to work during the installation, with consequent reduction of office efficiency. Furthermore, the drilling of the anchor holes in cement floors by electric hammers or the like creates a dust problem.

Furthermore, it frequently happens that the four lead anchor members which in accordance with the prior art practice are positioned in the floor to receive a given partition support plate are misaligned with the cooperating holes in the base plate of the post, with the result that it is necessary to ream larger holes in the partition post base plate to permit lining up the base plate of the partition post with the screw holes in the anchor members. It frequently happens, also, that the misalignment just described is so bad that only two of the screws may be passed through the base plate of the post into engagement with the lead anchor members instead of the four screws usually provided at the four corners of the post base plate.

A further disadvantage of posts mounted only on a directly-connected base plate or foot is that it is not practical to employ newly developed fastening techniques using explosively driven studs. The use of explosively-driven studs permits a very rapid, secure and efficient connection of members to a concrete floor. However, with posts having a base plate or foot directly connected thereto, as is common in office partition posts, it is difficult and impractical to use explosively-driven studs for directly connecting the attached base plate of the post to the floor. There are several reasons for this, as follows:

(1) The threaded stud loses its holding power when fired through the steel base plate into the concrete, even when a hole is provided in the base plate through which the explosively-driven stud may be fired.

(2) Firing of an explosively-driven stud through a post base plate frequently causes damage to the stud and its thread.

(3) Firing of an explosively-driven stud through a post base plate seated on a concrete or a tile-over-concrete floor frequently causes shaling of the concrete or of both the tile and concrete. This shaling does not occur when the stud is fired directly into the floor without an intervening post base plate, as is possible using the anchor plate of the present invention.

(4) Firing of an explosively driven stud through a post base plate seated on a concrete floor presents safety hazards which are not presented when the stud is fired directly into the floor without an intervening post base plate, as is possible using the anchor plate of the present invention.

Thus, the prior art practice of anchoring posts such as partition posts to a concrete floor is noisy, creates dust, and is a very time consuming and uneconomical operation. Also, the prior art method frequently results in poor alignment of the post members and their attached base plates relative to the lead anchor members in the floor. Furthermore, the prior art post mounting arrangement is not suitable for use with explosively-actuated fastening studs which permit a great saving of time and labor.

Accordingly, it is an object of this invention to provide an anchoring or mounting device and method for post members, such as partition posts of the type used in office installations, which is much more efficient than the anchoring arrangements of the prior art and which results in great savings in time and labor.

It is another object of this invention to provide an anchoring device for posts such as partition posts which simplifies the installation of office partitions and the like and which eliminates problems of misalignment of the post foot member with respect to the mounting means in the supporting floor.

Still another object of the invention is to provide a means and method of anchoring partition posts and the like to a concrete floor which eliminates the prolonged periods of noise and the creation of dust inherent in the prior art method of anchoring partition posts to concrete floors.

Still another object of the invention is to provide an anchoring means for posts such as partition posts, which is strong and secure and which has a high safety factor.

Still another object of the invention is to provide a means and method of mounting partition posts and the like to a supporting floor in which the support member for the post may be easily adjusted to obtain proper alignment of the post and its support without the necessity of reaming enlarged holes in the foot member of the partition post.

Still a further object of the invention is to provide an anchoring or mounting construction for partition posts and the like in which the fasteners such as the studs and mating nuts which secure the anchor to the floor are concealed from view to provide a neat mounting arrangement.

Still a further object of the invention is to provide an anchoring or mounting construction for partition posts and the anchor member is not damaged in any way either during the installation or removal of the anchor member, thereby permitting reuse of the anchor if desired.

Still a further object of the invention is to provide an anchor means for use with posts such as partition posts which makes practical the anchoring of the post to a concrete floor by means of explosively driven studs.

Still a further object of the invention is to provide a mounting arrangement for partition posts and the like which is adapted for use with partition posts of different manufacturers and thus is substantially universal in its application.

In achievement of these objectives, there is provided in accordance with this invention an anchor plate for posts such as office partition posts. The anchor plate is a generally rectangular member preferably formed of a suitable metal and having a base which is recessed or countersunk from the upper surface thereof to provide a concealed location for the fastenings which secure the anchor plate to the floor. When fastened to a concrete floor, the anchor plate is preferably fastened by means of explosively-driven stud members which are first driven into the floor, with the anchor plate subsequently being positioned over the studs. The anchor plate receives a flat base plate attached to the lower end of the post member, the base plate being secured in position on the anchor plate by any one of a variety of fasteners, such as spring-biased friction latches, cam latches, locking straps, or screws.

Further objects and advantages of the invention will become apparent from the following description taken in conjunction with the accompanying drawings in which:

FIG. 8 is a perspective view of a modified anchor plate using cam latches;

FIG. 9 is a perspective view of still another modified anchor plate utilizing simple pivoted latch members;

FIG. 10 is a perspective view of a modified anchor plate utilizing clamp type members to secure the base plate of the partition post in position on the anchor plate;

FIG. 11 is a perspective view of a modified anchor plate to which the base plate of the partition post is secured by screws;

FIG. 12 is a top plan view of an anchor plate having leveling screws for use in leveling the anchor plate where the floor is not level;

FIG. 13 is a view in section along line 13—13 of FIG. 12;

FIG. 14 is a perspective view of a modified anchor plate which is adapted to cooperate with a partition post base plate having flanges which interlockingly engage the anchor plate;

FIG. 15 is a view in vertical section showing the anchor plate used with a partition post having a base plate of the type having a tubular sleeve connection to the partition post;

FIG. 16 is an elevation view of the embodiment shown in FIG. 15;

FIG. 17 is a perspective view of still another modified form of anchor plate-base plate combination in which the base plate has flanges which interlockingly engage the anchor plate;

FIG. 18 is a perspective view of another modified form of anchor plate-base plate combination in which the base plate also includes flanges which interlockingly engage the anchor plate or floor flange;

FIG. 19 is a perspective view, partially broken away, showing an anchor plate-base plate combination having a modified type of fastening means; and FIG. 20 is a view in vertical section showing details of the fastening means of the device of FIG. 19.

Figure 2:
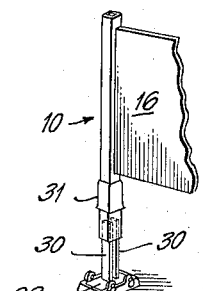
FIG. 2 is a view in elevation, partially broken away, showing the partition post partially disengaged from its base plate, to show the manner in which the partition post and its base plate are engaged.

Referring now to the drawings, and more particularly to FIGS. 1–7, there is shown a portion of a partition structure of the type used in offices including three post members generally indicated at 10, 12 and 14, respectively. Suitable panel members 16 and 18 are interlockingly engaged with the post members 10, 12, and 14 to provide a partition wall between the respective post members.

In accordance with the invention, certain of the post members of the partition structure are anchored to a concrete floor 20 by an anchor plate generally indicated at 22. In the embodiment shown in FIG. 1, anchor 22 serves as a support and anchor for post 10. A modified anchor generally indicated at 22' is provided where the post supported is positioned in directly abutting relation to a wall, as in the case of a corner post 12 which is positioned in abutting relation to wall 26. The post 14 is supported by an adjustable foot 28 and is not directly anchored to the floor as in the case of posts 10 and 12. Thus, in a typical installation using the anchor members to be hereinafter described not every partition post is necessarily anchored to the floor but only selected posts are so anchored, such as alternate posts, for example.

Figure 1:
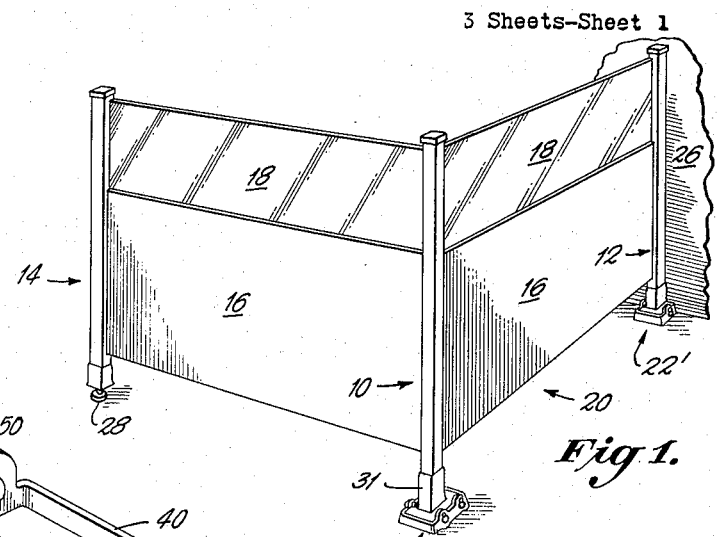
FIG. 1 is a perspective view of a typical office partition structure using the anchor plate of the present invention.
Figure 3:
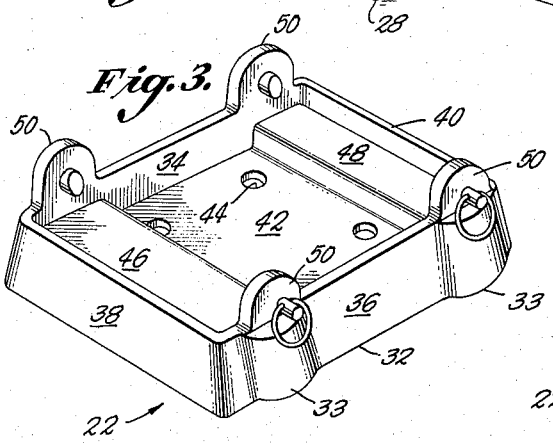
FIG. 3 is a perspective view of an anchor plate in accordance with the invention using spring-biased latches to secure the partition post base plate or foot member to the anchor plate.
Figure 4:
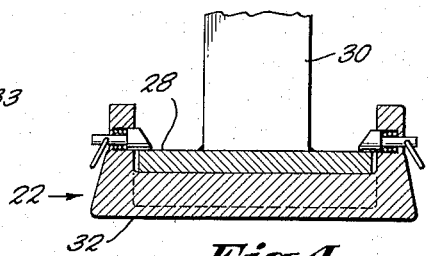
FIG. 4 is a view in transverse section of the anchor plate of FIG. 3 showing the partition base plate secured in position on the anchor plate.

As best seen in the views of FIGS. 1, 2 and 4, the tubular post 10 is of hollow rectangular tubular cross-section and has connected thereto a flat normally horizontal planar base plate 28 having two rigidly attached prong-like or bayonet-like lug members 30 which are laterally spaced from each other adjacent the center of plate 28. The base plate 28 is assembled with respect to the hollow tubular post 10 by telescopically moving the post 10 and lugs 30 with respect to each other until the bottom edge of post 10 abuts against the upper surface of plate 28. The post 10 is provided adjacent its lower end with an adjusting screw (not shown) which extends laterally into the hollow interior of post 10 and into engagement with one of the lugs 30 of base plate 28 to tighten the lug 30 against the inner surface of tubular post 10 to thereby secure post 10 to base plate 28 and to the lugs 30 upstanding from base plate 28. The base plate 28 and lugs 30 just described are of the type commercially provided as part of the post assembly by one manufacturer of office partitions. A tubular plinth 31 surrounds the outer surface of post 10 adjacent the lower end of the post for decorative purposes and is slid down to a position in which the lower end of the plinth is flush with the upper surface of base plate 28.

The anchor plate of the invention is best seen in the views of FIGS. 3–6 and is a generally rectangular-shaped member having a flat base surface 32, longitudinal side walls 34 and 36, and transverse end walls 38 and 40. In the embodiment shown, all of the walls 34, 36, 38, and 40 taper outwardly from the upper to the lower edge thereof. Each of the longitudinal walls 32, 34 is provided with a tapering convex surface 33 adjacent each of the opposite ends thereof.

The anchor plate 22 may be made of any suitable material, preferably metal, and may, for example, be made of cast aluminum although any other suitable material or metal may be used. The member 22 may be cast, molded, stamped, or produced by any other suitable manufacturing process. Anchor plate 22 includes a recessed interior base surface or normally horizontal planar base portion 42 having a plurality of apertures or holes 44 formed therein to permit securing anchor plate 22 to studs which extend upwardly from a floor surface as will be explained more fully hereinafter.

In the embodiment of FIGS. 3–6, the interior base 42 does not extend for the entire length of anchor plate 22 but is shortened due to the presence of transversely extending shoulders 46 and 48 which extend for the entire transverse interior width of anchor plate 22 adjacent opposite ends of plate 22. The top surface of shoulders 46 and 48 is depressed beneath the upper edges of the side walls 34, 36, 38 and 40 by a vertical distance substantially equal to the vertical thickness of base plate 28 connected to post 10. The internal dimensions of anchor plate 22 at the upper end thereof are such that the base plate 28 attached to post 10 is adapted to be received within the perimeter defined by the upper inner edge surfaces of the side walls 34, 36, 38 and 40 above the level of the upper surface of shoulders 46 and 48, with base plate 28 resting on the top surface of shoulders 46, 48. Shoulders 46, 48 thus provide a support surface means which supports the planar base plate 28 in vertically spaced relation above the planar base portion of the anchor plate. The area bounded by the perimeter just described is just slightly larger than the area of base plate 28 so as to leave sufficient clearance to permit easy insertion or removal of the base plate 28 with respect to the anchor plate 22.

The anchor plate 22 is provided with four upstanding ears or lugs 50 above the respective convex portions 33, two ears 50 being positioned adjacent opposite ends of the longitudinal side wall 34, while the other two ears 50 are positioned adjacent the opposite ends of the longitudinal side wall 36. Each of the ears 50 is provided with a drilled bore or passage 52 therein, and a counterbore 54 of smaller diameter than bore 52 communicates with bore 52 at one end and opens at its opposite end onto the outer face of the longitudinal wall 34 or 36. A friction latch 56 is slidably movable in the bore 52 and includes a rod or stem 58 which extends through bore 52 and through the communicating counterbore 54 to project beyond the outer surface of the longitudinal wall 34 or 36. A compression spring 60 is positioned between the inner end of latch 56 and the adjacent facing inner end wall of bore 52, spring 60 normally urging latch 56 toward the right with respect to the view shown in FIG. 6. The latch 56 is provided with a tapered under surface 62 so that when the latch 56 moves inwardly into overlying relation to base plate 28, as will be explained more fully hereinafter, the tapered surface 62 provides an increased frictional wedging engagement with the upper surface of base plate 28 with the continued movement of latch 56 into overlying relation to plate 28. The rod or stem portion 58 of the friction latch 56 is provided at its outer end with a pivoted ring 64 which may be grasped to retract the latch 56 against the force of spring 60 out of overlying engagement with respect to base plate 28.

In installing a partition structure using the anchor plate 22 hereinbefore described, the location of the foot of post 10 is first ascertained and a suitable mark is made on the concrete floor where the four holes 44 of the anchor plate 22 are to be located. With the anchor plate out of the way, four studs such as the studs 66 (FIG. 5) are driven into the concrete floor, preferably by an explosively actuated stud driver such as that distributed by Gregory Industries, Inc., Lorain, Ohio, under the trademark designation "Nelson Stud Driving System."

Figure 5:
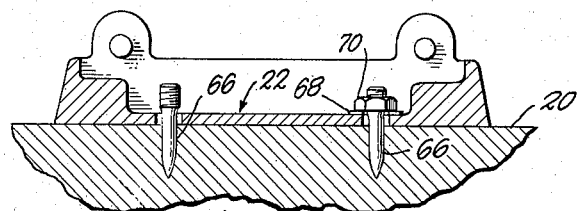
FIG. 5 is a view in longitudinal section of the anchor plate of FIG. 3 showing the manner of securing the anchor plate to a floor such as a concrete floor.
Figure 6:
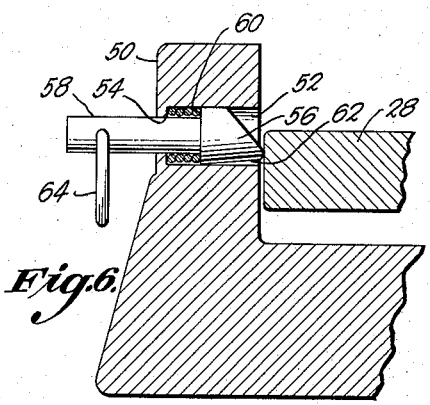
FIG. 6 is an enlarged view, partially in section and partially cut away, showing the spring-biased latch in retracted position as the base plate of the partition post is being lowered into position.

After the studs have been driven into position by the explosively actuated stud driver, the anchor plate 22 is then set down over the studs with the studs passing through the holes 44 as best seen in FIG. 5. The washer 68 and nut 70 are then positioned on the upper threaded end of stud 66 and the nut 70 is tightened into position to securely fasten the anchor plate 22 to the concrete floor 20. The apertures or holes 44 in the base 42 of anchor plate 22 are made oversize or of larger diameter than the diameter of stud 66 so that if, after the studs 66 are in position, it is found that some adjustment of anchor plate 22 is necessary, the oversize holes 44 permit a slight shifting of the anchor plate to obtain proper alignment of the anchor plate.

After the anchor plate is in position the assembled partition structure may then be set in place, with the base plate 28 at the bottom of post 10 being set into position so as to be received by the upper end of the anchor plate within the area bounded by the inner surfaces of walls 34, 36, 38 and 40 of the anchor plate and with the bottom surface of the base plate 28 resting on the upper surface of the shoulders 46 and 48 of the anchor plate. While the base plate 28 is being set in position, the spring biased friction latches 56 are moved to retracted position by pulling on the ring member 64. If desired, suitable detent means may be provided to hold latches 56 in retracted position while base plate 28 is being mounted on anchor plate 22. When base plate 28 is finally seated on the anchor plate 22 as seen in FIG. 4, friction latches 56 are moved by the springs 60 into overlying latching engagement with respect to the upper surface of base plate 28. If it is desired to remove the post member 10 from its mounting on the anchor plate 22, this may be easily done by merely retracting the latches 56 against the force of spring 60 to permit the plate 28 to be moved upwardly out of seated engagement with the anchor plate 22.

Figure 7:
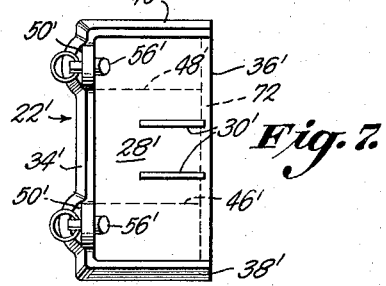
FIG. 7 is a top plan view of a modified anchor plate adapted for positioning immediately adjacent a wall.

There is shown in FIG. 7 a modified anchor plate 22' which is generally similar to anchor plate 22 previously described except that it is modified to receive a post such as the post 12 which is in directly abutting relation to a wall such as wall 26 of FIG. 1. In order to adapt the post 12 to be in abutting relation to an adajavent wall, the transverse dimension of anchor plate 22' is made less than that of the anchor plate 22, although the longitudinal dimension remains the same as that of the anchor plate 22. One longitudinal wall 34' of the anchor plate 22' is similar to the corresponding wall 34 of anchor plate 22 and includes upstanding ears 50' which receive latches 56' similar to those used with the anchor plate 22. However, the opposite longitudinal wall 36' is perpendicular throughout its entire length to the end walls 38' and 40' of the anchor plate 22' and does not include any ears 50 or convex surface portions 33 as does the wall 36 of the anchor plate 22. The anchor plate 22' includes shoulder portions 46' and 48' which are respectively similar to the shoulders 46 and 48 of anchor plate 22 but are correspondingly shorter in lateral dimension. The anchor plate 22' also includes a short ledge 72 which connects the shoulders 46' and 48' and is of the same height as those shoulders. The base plate 28' of the post 12 is adapted to lie on the upper surface of the shoulders 46' and 48' and on the ledge 72 of anchor plate 22'. Base plate 28' is held in position by the two overlying friction latches 56'. If required, additional fastening means of a suitable type may be provided to securely hold the base plate 28' to the anchor plate 22' along the edge adjacent the wall. Also, instead of shortening the anchor plate and base plate in their longitudinal dimension as shown in FIG. 7, these members may instead be shortened in their transverse dimension if the transverse dimension is to lie parallel to the wall.

The shortened lateral dimensions of the anchor plate 22' and the cooperating base plate 28', together with the location of the bayonet prong members or lugs 30' carried by the upper surface of base plate 28', permit the post 12 to lie in directly abutting relation to the adjacent wall 26 of FIG. 1. The bayonet prong members or lugs 30' are so located on the upper surface of base plate 28' that the vertical wall surface of post 12 which lies adjacent building wall 26 lies substantially in flush vertical alignment with the straight longitudinal edge 36' of anchor plate 22'. Anchor plate 22' includes a recessed base similar to the base 42 of anchor plate 22, but of smaller lateral dimension. The recessed base of anchor plate 22' is provided with apertures for receiving studs 66 as in anchor plate 22.

There is shown in FIG. 8 a modified anchor plate generally indicated at 22A which is similar to the anchor plate 22 previously described except that the ear or lug members 50 and the friction latches 56 have been eliminated and cam latches generally indicated at 82, which also have a frictional clamping action on the base plate, have been substituted in place of the friction latches 56 to secure the base plate 28 in position on the upper portion of the anchor plate. The anchor plate 28 is received within the bounding perimeter defined by the interior surfaces of walls 34, 36, 38, 40 in the same manner as that previously described. The cam latches 82 include a bushing 84 which is rotatable about the vertical axis of a screw or stud member 86 fastened to the upper surface of each of the projecting convex portions 33 adjacent the opposite ends of side walls 34, 36. The pivotally movable bushing 84 has attached thereto a locking cam 88 having a handle portion 90. The handle portion 90 may be grasped to rotate the latch about the pivotal support 86 until the cam portion 88 is in overlying relation to the base plate 28. When this type of locking cam is used, the upper surface of the base plate 28 which lies adjacent each of the rotatable cam members 88 is preferably provided with a raised cam surface in the path of movement of the rotatable locking cam 88 to provide a wedging action between the upper surface of plate 28 and the locking cam 88 as the cam is rotated into overlying relation to base plate 28.

There is shown in FIG. 9 still another modified form of anchor plate 22B which is generally similar to the anchor plates 22 and 22A previously described but differs in the use of a different type of fastening means for securing the base plate 28 into secure position with respect to the anchor plate. The fastening means used with the anchor plate 22B is generally indicated at 102 and includes a latch member having a lug 104 extending radially from a head 106 which is rotatable about a screw pivot 108. When the lug 104 of each of the latch members 102 is rotated about its respective pivotal axis into overlying relation to base plate 28, the base plate is suitably retained in position on the anchor plate.

Still another type of fastening means for securing the base plate to the anchor plate is shown in FIG. 10 in which the anchor plate 22C, which is generally similar to the anchor plates 22A and 22B previously described, includes a metal strap member 110 which is pivotally secured by a screw or pin 112 to the upper surface of convex portion 33 one of the side walls of the anchor plate. The opposite end of the strap 110 is slotted as indicated at 114. When the base plate 28 of the post is suitably positioned on the anchor plate 22C, the strap member 110 may be swung about its pivotal connection 112 to engage the slotted end 114 of strap 110 with the screw 116 at the opposite side of the anchor plate. After the slot 114 has engaged screw 116, the screw 116 may then be tightened to firmly hold the strap 110 in position. A pair of straps 110 are provided at each of the opposite longitudinal ends of anchor plate 22C to secure the base plate 28 in position.

There is shown in FIG. 11 a further modified embodiment of the anchor plate in which the base plate of the post is adapted to be fastened by machine screws or self-tapping screws directly to the surface of the anchor plate. Thus, the anchor plate 120 shown in FIG. 11 includes longitudinal side walls 122 and 124 and transverse end walls 126 and 128. The interior recessed base 130 of anchor plate 120 is provided with four apertures 132 for receiving stud members such as stud 66 shown in FIG. 5. At each of the four corners of the anchor plate there is provided a square shoulder 134 having a screw hole 136 therein. The base plate 28" has longitudinal and transverse dimensions substantially equal to those of the corresponding longitudinal and transverse dimensions of the upper edges of anchor plate 120 so that the base plate 28" may be positioned in overlying relation to the top edges of anchor plate 120. The side walls 122, 124, end walls 126, 128, and the square shoulders 134 all constitute support surface means which support the planar base plate 28" above the planar base portion 130 of the anchor plate. The base plate 28" is provided at each of its four corners with countersunk holes 138 which receive machine screws or the like adapted to secure base plate 28" to the upper surface of anchor plate 120.

There is shown in FIGS. 12 and 13 an anchor plate generally indicated at 22D which is similar to the anchor plate 22 previously described. Anchor plate 22D is provided with four passages 44 which receive the explosively-driven studs 66 for securing the anchor plate to the floor. Anchor plate 22D is also provided with four threaded passages 45 which receive leveling screws 47. The passages 45 are symmetrically located in the four corners of the anchor plate adjacent the outer perimeter thereof, and may, for example, be located in the shoulders 46 and 48 of the similar anchor plate 22 shown in FIG. 3. The passages 45 for receiving leveling screws 47 may also be located in the recessed portion of anchor plate if desired. When the floor on which the anchor plate is to be fastened is not level, the leveling screws 47 may be used to level the anchor plate before the nuts 70 are tightened onto the stud members 66. A rubber or plastic sleeve or skirt may surround the outer surface of the anchor plate and be adjusted to cover any opening resulting from the leveling operation produced by the use of leveling screws 47. The leveling screws 47 may, of course, be used with any of the various embodiments of the anchor plate described and shown in this application.

There is shown in FIG. 14 a still further modified embodiment of the invention including an anchor plate generally indicated at 140 having longitudinal side walls 142, 144 and transverse end walls 146 and 148 and a normally horizontal planar recessed base 150 provided with apertures 152 for receiving stud members such as stud 66 of FIG. 5. Each of the opposite end walls 146 and 148 is provided with an ear or projection 154 which receives a spring-biased latch 156 similar to the friction fastener 56 shown and described in the embodiment of FIGS. 1–6, inclusive. The base plate 158 has a normally horizontal planar portion having integral oppositely disposed downwardly depending longitudinal flanges 160 and oppositely disposed downwardly depending transverse end flanges 162. The end flanges 162 have apertures 164 therein which are adapted to receive the inwardly projecting ends of latch elements 156 whereby the base plate 158 is received in securely interlocked relation with respect to the anchor plate 140. The base plate 158 and its downwardly depending flanges 160 and 162 are so dimensioned that the oppositely-disposed longitudinal flanges 160 and transverse flanges 162 are received in telescopic interfitting relation with respect to the longitudinal and transverse walls of anchor plate 140 with just sufficient clearance to permit easy attachment or detachment of base plate 158 with respect to anchor plate 140. The longitudinal flanges 160 and transverse flanges 162 provide support surface means which support the planar base plate 158 in vertically spaced relation above the planar base portion of the anchor plate.

There is shown in FIGS. 15 and 16 an anchor plate generally indicated at 120' which is generally similar to the anchor plate 120 shown in FIG. 11 and which is fastened to the concrete floor by means of studs 66'. A base plate generally indicated at 170 is secured by means of screws 172 to anchor plate 120'. Rigidly attached by welding or the like to the upper surface of base plate 170 is a sleeve member 174 of hollow rectangular cross-section. A post member 10' which is also of hollow rectangular cross-section, and which may be generally similar to the post 10 of FIG. 1, is telescopically received within the interior of the hollow rectangular cross-section sleeve 174. At the lower end of post 10' is provided an end wall 176 which threadedly receives a threaded stud member 178, the head 180 of which rests on the upper surface of base plate 170. Suitable oppositely disposed openings 182 are provided in the lower end of outer sleeve 174 to give access to threaded stud 178, whereby the stud 178 may be adjusted to correspondingly adjust the height of post 10′ relative to base plate 170. A set screw 182 extends through sleeve 174 into frictional engagement with a surface of post 10′ to prevent relative movement of post 10′ and sleeve 174 after the desired height adjustment has been obtained for post 10′ by means of adjusting stud 178.

There is shown in FIG. 17 an anchor plate or floor flange generally indicated at 120′ which may be similar to the anchor plate 120 previously described and which is adapted to receive a base plate generally indicated at 190 having a normally horizontal planar portion with integral downwardly depending transverse end flanges 192 at each of the opposite ends thereof and downwardly depending longitudinally-extending flanges 194 on each of the longitudinal sides thereof. The base plate 190 with its downwardly depending flanges 192 and 194 is adapted to fit over the anchor plate or floor flange 120′ in overlapping or telescopic relation thereto. Suitable screw fastening means may be passed through apertures 196 in the four corners of base plate 190, the screw fasteners being received in threaded passages 198 in the four corners of anchor plate 120′. In the embodiment shown in FIG. 17, bayonet-like lug members 30″ of the type hereinbefore described extend upwardly from the upper surface of base plate 190 to engage the tubular post member as hereinbefore described. However, a hollow rectangular sleeve such as the sleeve 174 of FIG. 15 may be used instead of the lug members 30‴ to engage the post member.

There is shown in FIG. 18 an anchor plate or floor flange generally indicated at 200 which includes oppositely-disposed longitudinally-extending walls 202 and oppositely-disposed end walls 204. A base plate 190′ similar to the base plate 190 shown in FIG. 17 and having opposite end walls 192′ and opposite longitudinally-extending side walls 194′, is adapted to fit over the anchor plate or floor flange 200 in telescopically overlapping relation thereto. Spring-biased fastening means 140′ similar to those shown in FIG. 14 are carried by the opposite end walls 192′ of base plate 190′. The stem portion of the spring-biased fasteners 140′ are adapted to be received in oppositely-disposed apertures 206 in the end walls 204 of anchor plate or floor flange 200 to thereby hold the base plate 190′ assembled with respect to the anchor plate 200. A hollow tubular sleeve 174′ is attached to and upstanding from the upper surface of base plate 190′ to receive the partition post, as in the embodiment of FIGS. 15 and 16.

In the embodiment shown in FIGS. 19 and 20, there is provided an anchor plate or floor flange 200′ and a base plate 190″ having a normally horizontal planar portion with downwardly depending longitudinal flanges 194″ and downwardly depending end flanges 192″ which are adapted to lie on the outside of the longitudinal and end walls, respectively, of anchor plate or floor flange 200′. The opposite end walls of floor flange 200′ are provided with slots 210 each of which is adapted to receive a removable spring fastener generally indicated at 212 and best seen in the view of FIG. 20. The fastener 212 includes a shaft 214 having on its inner end a lug 216 and on its outer end an operating knob 218. A spring 220 is carried by shaft 214 and is adapted to bias the latching means 212 in an outward direction. When the base plate 190″ is positioned in superposed overlying relation to anchor plate or floor flange 200′, the detachable fastener 212 is inserted through a slot 210, and after the lug 216 passes into the recessed base of anchor plate 200′, the knob 218 is then turned to a position in which the lug 216 is perpendicular to the axis of slot 210 and thus the lug 216 is prevented from moving backwardly out through the slot. The members 190″ and 200′ are thereby secured together. The base plate 190′ may be removed from anchor plate or floor flange 200′ by rotating lug 216 to a position in which it is aligned with slot 210, and then withdrawing the fastener from engagement with anchor plate 200′.

In the embodiments of FIGS. 17, 18, 19, 20, the vertical side and end walls of the anchor plate, such as side walls 202 and end walls 204 of anchor plate 200 of FIG. 18, provide support surfaces which support the normally horizontal planar portion of the base plate in vertically spaced relation above the planar portion of the anchor plate.

It can be seen from the foregoing that there is provided in accordance with this invention an anchoring means and method for free standing posts such as partition posts and the like which represent an improvement over the prior art means and method for anchoring such posts. The use of the anchor plate hereinbefore described greatly simplifies the installation of posts, particularly posts for office partitions, and provides a great saving in time and labor as well as a reduction in noise and dust inherent in the prior art method of installation of these posts and their anchoring means. The use of the anchor plate in accordance with the invention permits a whole row of anchor plates corresponding to a whole row of posts to be installed prior to the erection of the partition posts, and any misalignment problems detected when installing the posts may be easily corrected by shifting the anchor plates relative to their fastening studs due to the provision of the oversize holes in the base portion of the anchor plate. Furthermore, the recessed bases of the anchor plate permits concealment of the fastenings such as studs and mating nuts which secure the anchor plates to the supporting floor. The methods and means of installing the anchor plates does not damage the anchor plates in any way either during their installation or during their removal, if their removal should be required for some reason, thereby permitting the anchor plates to be reused if desired. Also, the anchor plates have the advantage that they may be quickly attached or detached with respect to the base plates of the posts due to the use of the quick detachable fasteners such as the spring-biased friction latches, the cam locks, the screw fasteners, and the clamp straps described hereinbefore, all of which permit quick and easy attachment or detachment of the base plate of the partition post with respect to the anchor plate. The anchor plates also may incorporate center line markings for ease in aligning the anchor plates during their installation.

The anchor plates of the invention have the further important advantage that they are adapted for installation by explosively-actuated studs, thereby permitting fast and efficient anchoring of the posts to a concrete floor. The use of the anchor plates which may be moved out of position while the explosive studs are being fired, and then subsequently positioned over the studs, permits the explosively-actuated studs to be used with a high degree of safety.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. In combination, a plurality of vertical post members, a vertical wall supported by and extending between said post members, at least one of said post members having a base plate attached to the bottom end thereof, said base plate including at least a normally horizontal planar portion, an anchor plate separate from said one post member, said anchor plate having an upwardly open recess therein and a normally horizontal planar base portion forming a lower boundary of said recess, said planar base portion of said anchor plate including aperture means for receiving first fastening means which secure said anchor plate to a supporting floor, first fastening means extending through said aperture means into the supporting floor, said aperture means being so dimensioned relative to said first fastening means as to permit horizontal sliding adjusting movement of said anchor plate, said anchor plate having an area whose contour conforms substantially to the peripheral contour of said normally horizontal planar portion of said base plate whereby said normally horizontal planar portion of said base plate may be positioned in superposed relation above said anchor plate substantially in registry therewith, support surface means carried by at least one of said plates whereby to support said normally horizontal planar portion of said base plate in vertically spaced relation above said planar base portion of said anchor plate and above said recess of said anchor plate whereby said planar portion of said base plate forms an upper closure for said recess, second fastening means carried by at least one of said plates and securing said base plate to said anchor plate, said second fastening means including an integral operating portion lying substantially externally of the assembled base plate and anchor plate, said second fastening means being actuatable to permit direct vertical engaging or disengaging movement of said base plate in a direction substantially perpendicular to the normally horizontal plane of said anchor plate, and levelling means carried by one of said plates.

2. The combination defined in claim 1 in which said anchor plate and said base plate are telescopically engageable with each other.

3. The combination defined in claim 1 in which said second fastening means is mounted on one of said plates and includes a fastening portion movable into overlying frictional engagement with the other of said plates.

4. The combination defined in claim 1 in which said second fastening means is a spring-biased latch member mounted on one of said plates and movable into latching engagement with the other of said plates.

5. The combination defined in claim 1 in which said second fastening means is a screw-threaded means.

6. In combination, a plurality of vertical post members, a vertical wall supported by and extending between said post members, at least one of said post members having a base plate attached to the bottom end thereof, said base plate including at least a normally horizontal planar portion, an anchor plate separate from said one post member, said anchor plate having an upwardly open recess therein and a normally horizontal planar base portion forming a lower boundary of said recess, said planar base portion of said anchor plate including aperture means for receiving stud-like first fastening means which mount said anchor plate on a supporting concrete floor, stud-like first fastening means extending downwardly through said aperture means and into said concrete floor, said stud-like first fastening means including a portion thereof extending above said horizontal planar base portion of said anchor plate and into said recess, said aperture means being so dimensioned relative to said stud-like first fastening means as to permit horizontal sliding adjusting movement of said anchor plate, second fastening means secured to said portion of said stud-like first fastening means which extends into said recess whereby to secure said anchor plate to said concrete floor, said anchor plate having an area whose contour conforms substantially to the peripheral contour of said normally horizontal planar portion of said base plate whereby said normally horizontal planar portion of said base plate may be positioned in superposed relation above said anchor plate substantially in registry therewith, support surface means carried by at least one of said plates whereby to support said normally horizontal planar portion of said base plate in vertically spaced relation above said planar base portion of said anchor plate and above said recess of said anchor plate whereby said planar portion of said base plate forms an upper closure for said recess, third fastening means carried by at least one of said plates and securing said base plate to said anchor plate, said third fastening means including an integral operating portion lying substantially externally of the assembled base plate and anchor plate, said third fastening means being actuatable to permit direct vertical engaging or disengaging movement of said base plate in a direction substantially perpendicular to the normally horizontal plane of said anchor plate, and levelling means carried by one of said plates.

References Cited by the Examiner
UNITED STATES PATENTS

| | | | |
|---|---|---|---|
| 1,120,048 | 12/1914 | Glass | 287—20 |
| 1,362,352 | 12/1920 | Rasmussen | 189—36 |
| 1,724,507 | 8/1929 | Clement | 258—1.5 |
| 1,805,311 | 5/1931 | Hill | 52—292 |
| 2,259,610 | 10/1941 | Bryson | 94—1.5 |
| 2,903,103 | 9/1959 | Pfaff | 189—36 |
| 2,949,984 | 8/1960 | Daniels | 52—127 |
| 2,985,261 | 5/1961 | Kubesh | 52—120 |

FRANK L. ABBOTT, *Primary Examiner.*

JOEL REZNEK, JACOB L. NACKENOFF,
*Examiners.*

W. L. SHEDD, L. R. RADANOVIC,
*Assistant Examiners.*